US008009795B2

(12) United States Patent
Arakita et al.

(10) Patent No.: US 8,009,795 B2
(45) Date of Patent: Aug. 30, 2011

(54) IMAGE PROCESSING APPARATUS AND X-RAY COMPUTER TOMOGRAPHY APPARATUS

(75) Inventors: Kazumasa Arakita, Nasushiobara (JP); Naruomi Akino, Nasushiobara (JP)

(73) Assignees: Kabushiki Kaisha Toshiba, Tokyo (JP); Toshiba Medical Systems Corporation, Otawara-Shi, Tochigi-Ken (JP)

( * ) Notice: Subject to any disclaimer, the term of this patent is extended or adjusted under 35 U.S.C. 154(b) by 0 days.

(21) Appl. No.: 12/560,655

(22) Filed: Sep. 16, 2009

(65) Prior Publication Data

US 2010/0074490 A1 Mar. 25, 2010

(30) Foreign Application Priority Data

Sep. 19, 2008 (JP) ................................. 2008-241538

(51) Int. Cl.
*A61B 6/00* (2006.01)
(52) U.S. Cl. .............................. 378/8; 382/128; 382/131
(58) Field of Classification Search ................... 378/4, 8
See application file for complete search history.

(56) References Cited

U.S. PATENT DOCUMENTS

| | | | | |
|---|---|---|---|---|
| 4,339,799 A | * | 7/1982 | Abele et al. ....................... | 378/11 |
| 5,602,891 A | * | 2/1997 | Pearlman ......................... | 378/62 |
| 6,501,981 B1 | * | 12/2002 | Schweikard et al. .......... | 600/427 |
| 6,621,889 B1 | * | 9/2003 | Mostafavi ........................ | 378/65 |
| 6,728,394 B1 | * | 4/2004 | Chen et al. ..................... | 382/107 |
| 6,937,696 B1 | * | 8/2005 | Mostafavi ........................ | 378/95 |
| 7,171,257 B2 | * | 1/2007 | Thomson ....................... | 600/427 |
| 7,630,472 B2 | * | 12/2009 | Tsuyuki et al. .................... | 378/8 |
| 2004/0151357 A1 | * | 8/2004 | Shi et al. ........................ | 382/131 |
| 2005/0002549 A1 | * | 1/2005 | Nay et al. ....................... | 382/130 |
| 2005/0053268 A1 | * | 3/2005 | Breen ............................ | 382/128 |
| 2005/0074154 A1 | * | 4/2005 | Georgescu et al. ........... | 382/128 |
| 2006/0093195 A1 | * | 5/2006 | Fox ................................ | 382/128 |
| 2006/0229513 A1 | * | 10/2006 | Wakai ............................ | 600/407 |
| 2008/0044080 A1 | | 2/2008 | Li | |

FOREIGN PATENT DOCUMENTS

JP 2007-307358 A 11/2007

* cited by examiner

*Primary Examiner* — Edward J Glick
*Assistant Examiner* — Alexander H Taningco
(74) *Attorney, Agent, or Firm* — Knoble Yoshida & Dunleavy, LLC

(57) ABSTRACT

An image processing apparatus includes a storage unit which stores the data of a plurality of images including an examination target organ of an object, a reference point determining unit which determines, from each of the images, a reference point which is located in or near a region of the examination target organ and undergoes a relatively small displacement accompanying respiratory motion or, heartbeat, and a moving amount calculation unit which determines the position of each of a plurality of points of interest included in the region of the examination target organ relative to the reference point for each of the images, and calculates, based on the determined positions, moving amounts that corresponding points of interest between the images move accompanying the respiratory motion or the heartbeat.

19 Claims, 4 Drawing Sheets

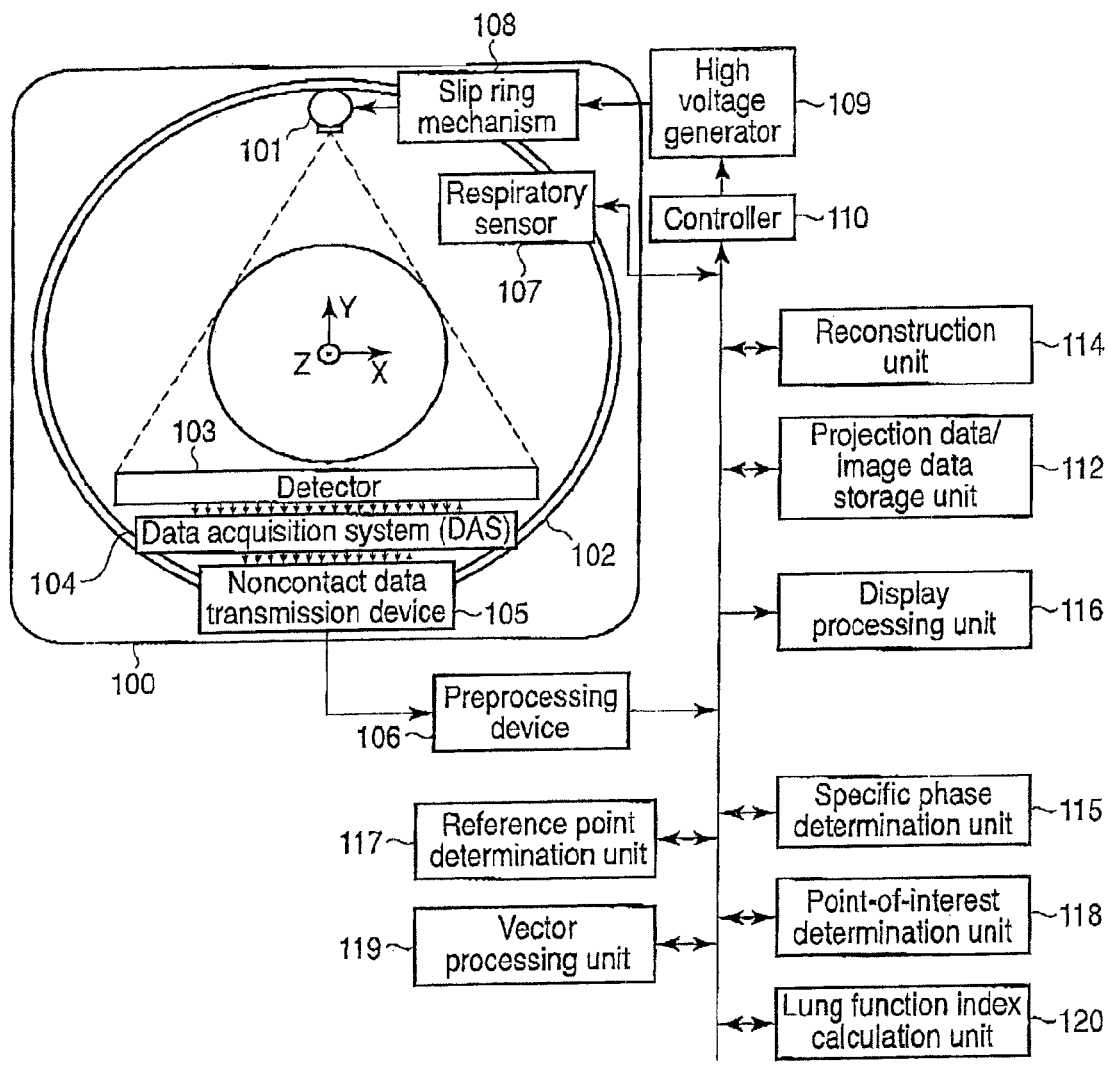
F I G. 1

IMAGE PROCESSING APPARATUS AND X-RAY COMPUTER TOMOGRAPHY APPARATUS

CROSS-REFERENCE TO RELATED APPLICATIONS

This application is based upon and claims the benefit of priority from prior Japanese Patent Application No. 2008-241538, filed Sep. 19, 2008, the entire contents of which are incorporated herein by reference.

BACKGROUND OF THE INVENTION

1. Field of the Invention

The present invention relates to an image processing apparatus and an X-ray computer' tomography apparatus.

2. Description of the Related Art

There are attempts to perform analysis on lung wall, motion and the moving amount of tissue (to be referred to as lung function analysis hereinafter) by acquiring, for example, image data in a plurality of respiratory phases in the lung field using an X-ray computer tomography apparatus (X-ray CT apparatus), a magnetic resonance imaging apparatus (MRI apparatus), and the like. A method of performing function analysis by observing the dynamics of tissue is effective from the viewpoint of diagnosis and early detection of diseases. This method is also effective from the viewpoint of computer aided diagnosis (CAD).

Conventionally, as a lung function analysis technique, there has been available a technique of extracting a lung region by threshold processing and determining a rate of change in capacity or the like from the information of the extracted lung region. However, it is not possible to perform more specific, detailed quantitative examination.

BRIEF SUMMARY OF THE INVENTION

It is an object of the present invention to implement quantitative analysis on a moving region such as the lung or heart.

According to the first aspect of the present invention, there is provided an image processing apparatus comprising: a storage unit which stores data of a plurality of images including an examination target organ of an object; a reference point determining unit which determines, from each of the images, a reference point which is located in or near a region of the examination target organ and undergoes a relatively small displacement accompanying respiratory motion; and a moving amount calculation unit which determines a position of each of a plurality of points of interest included in the region of the examination target organ relative to the reference point for each of the images, and calculates, directly based on the determined positions and the reference point, moving amounts for the corresponding points of interest between the images accompanying the respiratory motion.

According to the second aspect of the current invention, there is provided an X-ray computer tomography apparatus comprising: an X-ray tube which generates X-rays; an X-ray detector which generates projection data by detecting X-rays transmitted through an object; a reconstruction processing unit which reconstructs a plurality of images based on the projection data; and an image processing unit which processes the images, the image processing unit including a storage unit which stores data of the plurality of images, a reference point determining unit which determines, from each of the images, a reference point which is located in or near a region of the examination target organ and undergoes a relatively small displacement accompanying respiratory motion, and a moving amount calculation unit which determines a position of each of a plurality of points of interest included in the region of the examination target organ relative to the reference point for each of the images, and calculates, directly based on the determined positions and the reference point, moving amounts for the corresponding points of interest between the images accompanying the respiratory motion.

According to the third aspect of the current invention, there is provided an image processing apparatus comprising: a storage unit configured to store data of at least 3-dimensional X-ray CT images which include an examination target organ of an object and which are taken in different phases of respiration; a reference point determining unit configured to determine a reference point located in or near the examination target organ, from the 3-dimensional X-ray CT images; and a moving amount calculation unit configured to determine a plurality of points of interest on the 3-dimensional X-ray CT images of the examination target organ, and to calculate a moving amount by which each of the points of interest moves as a result of a phase change of respiration, relative to the reference point.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the arrangement of an X-ray computer tomography apparatus according to an embodiment of the present invention;

DETAILED DESCRIPTION OF THE INVENTION

Figure 2:
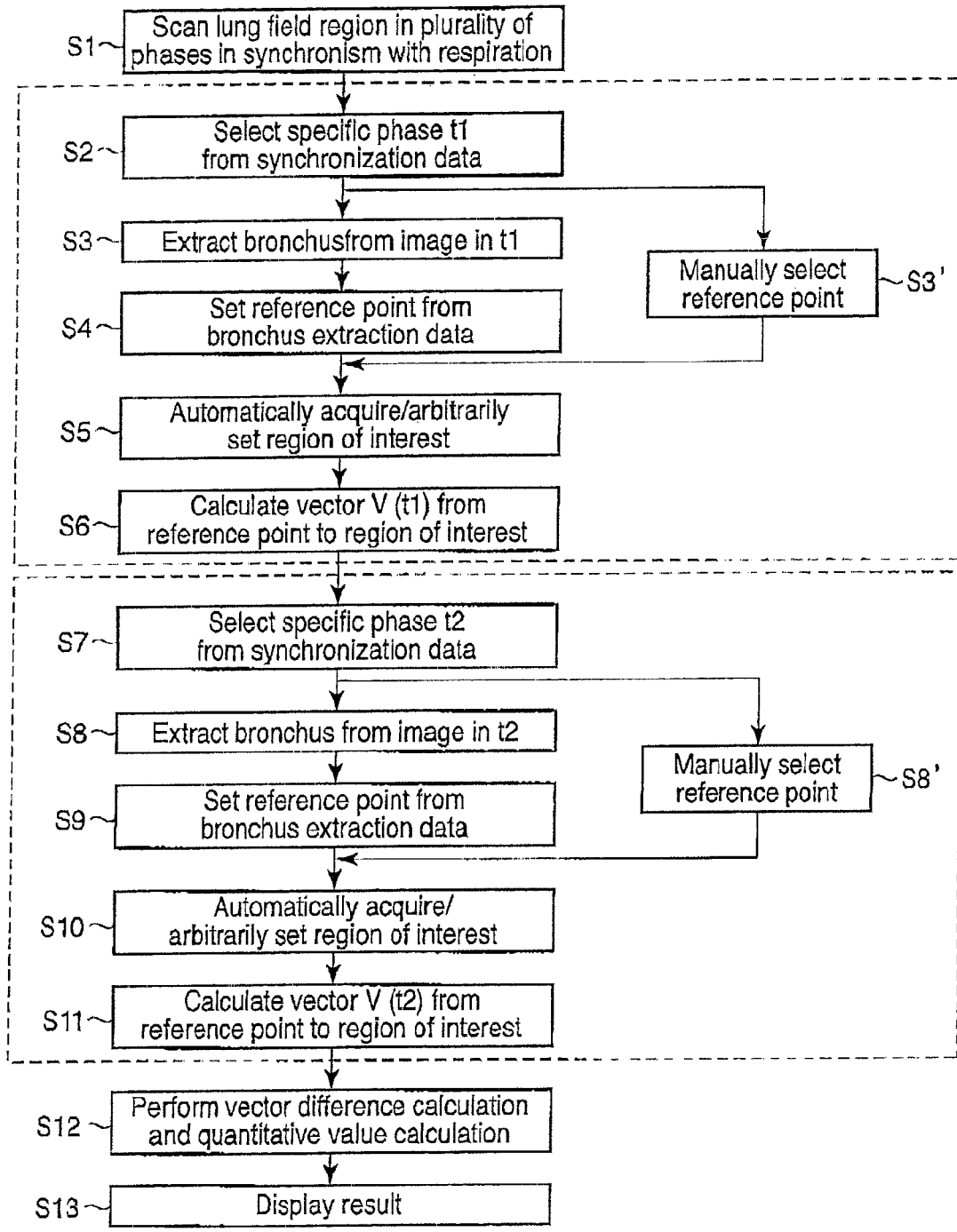
FIG. 2 is a flowchart showing an operation procedure according to this embodiment.

An embodiment of an image processing apparatus and an X-ray, computer tomography apparatus including it according to the present invention will be described below with reference to the views of the accompanying drawing. Note that X-ray computer tomography apparatuses include a rotate/rotate-type apparatus in which an X-ray tube and an X-ray detector rotate together, around an object, and a stationary/rotate-type apparatus in which many X-ray detectors are arranged in the form of a ring, and only an X-ray tube rotates around an object. The present invention can be applied to either type. Rotate/rotate-type apparatuses include a single-tube apparatus having one pair of an X-ray tube and an X-ray detector mounted on a rotating frame, and a so-called multi-tube apparatus having a plurality of pairs of X-ray tubes and X-ray detectors mounted on a rotating frame. The present invention can be applied to either type. X-ray detectors include an indirect conversion type that converts X-rays transmitted through an object into light through a phosphor such as a scintillator and further converts the light into electric charges through photoelectric conversion elements such as photodiodes, and a direct conversion type that uses generation of electron-hole pairs in a semiconductor by X-rays and migration of the electron-hole pairs to an electrode, i.e., a photoconductive phenomenon. The present invention can use either type.

FIG. 1 shows the arrangement of an X-ray computer tomography apparatus according to this embodiment. A gantry 100 has an X-ray tube 101. Upon receiving a tube voltage and filament current from a high voltage generator through a slip ring 108, the X-ray tube 101 generates an X-ray cone beam. The X-ray tube 101 is mounted on a rotating frame 102 which is supported to be rotatable about a rotation axis (Z-axis), together with an X-ray detector 105.

Figure 3:
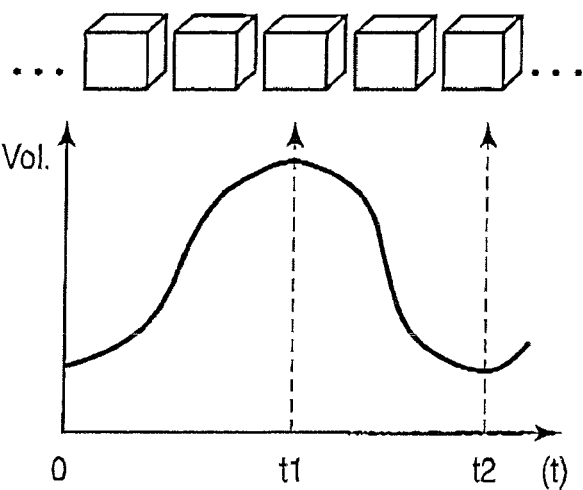
FIG. 3 is a graph for supplementary explanation of step S2 in FIG. 2.

A respiratory sensor 107 is provided to detect the respiratory motion of an object. As the respiratory sensor 107, a pneumotachometer which measures the flow rate of expired gas as exemplified in FIG. 3 is used. Note that the respiratory sensor 107 can be replaced by an electrocardiograph or pulsation sensor which detects a phase of the cardiac motion (heartbeat) of an object, in accordance with an examination target. Note that a "respiratory phase" to be used below is an expression each stage within one period in n/100 (n %) by dividing one respiratory period into 100 segments.

An X-ray detector 103 detects the X-rays emitted from the X-ray tube 101 and transmitted through the object. The X-ray detector 103 is of a multislice type or two-dimensional array type corresponding to a cone beam. That is, the X-ray detector 103 has a plurality of X-ray detection element arrays arranged side by side along the rotation axis RA. Each X-ray detection element array has a plurality of X-ray detection elements arrayed in a line along a direction perpendicular to the rotation axis RA.

A data acquisition system (DAS) 104 amplifies an output from the X-ray detector 103 for each channel, and converts it into a digital signal. For example, this signal is then sent to a preprocessing device 106 via a noncontact data transmission device 105 and undergoes correction processing such as sensitivity correction in the device 106. A projection data storage unit 112 stores the resultant data as so-called projection data at a stage immediately before reconstruction processing, together with a respiratory phase code corresponding to the stage at which the data is acquired. In data acquisition (scanning), a scan controller 110 controls a rotation driving unit, a high voltage generator 109, the data acquisition system 104, the projection data storage unit 112, and the like.

A vector processing unit 119 reconstructs a plurality of two- or three-dimensional image data in different respiratory phases based on projection data repeatedly acquired by dynamic scanning. The projection data storage unit 112 stores the plurality of two- or three-dimensional image data in different respiratory phases together with a respiratory phase code corresponding to, for example, the central phase of a set of projection data used for the reconstruction processing.

A typical three-dimensional image reconstruction processing method is the Feldkamp method. As is well known, the Feldkamp method is an approximate reconstruction method based on a fan beam convolution/back projection method. Convolution processing is performed by regarding data as fan projection data on the premise that the cone angle is relatively small. However, back projection processing is performed along an actual ray. That is, an image is reconstructed by the following procedure: assigning Z-axis-dependent weights to projection data, performing convolution for the weighted projection data by using the same reconstruction function as that for a fan beam reconstruction, and performing back projection with respect to the data along an actual oblique ray having a cone angle.

As described above, the X-ray computer tomography apparatus according to this embodiment includes an image processing apparatus. The image processing apparatus includes, in addition to a projection data/image data storage unit 112, a specific phase determination unit 115, a display processing unit 116, a reference point determination unit 117, a point-of-interest determination unit 118, a vector processing unit 119, and a lung function index calculation unit 120.

The specific phase determination unit 115 determines a maximum inspiratory phase t1 and a maximum expiratory phase t2 by determining the maximal point and minimal point of a flow rate/time curve stored together with projection data.

The reference point determination unit 117 sets reference points on anatomically identical regions on an image in the maximum inspiratory phase t1 and an image in the maximum expiratory phase t2. Note that the reference point determined from the image in the maximum inspiratory phase t1 can be commonly used for the image in the maximum expiratory phase t2. A reference point is set in an examination target organ. In this case, a reference point is set in a region which is located in or near the lung field region and undergoes a relatively small displacement accompanying respiratory motion. Typically, such a reference point is preferably set at the second bifurcation of the bronchus existing in each of the left and right lungs. If, for example, the second bifurcation is not clear, the first bifurcation to the left and right lungs may be used as a reference point (see FIG. 4). For this purpose, first of all, the reference point determination unit 117 extracts a bronchus region by threshold processing from the image in the maximum inspiratory phase t1 and the image in the maximum expiratory phase t2. The bronchus is expressed in thin lines by performing thinning processing for the extracted bronchus region. A plurality of bifurcation points on the bronchus expressed in thin lines are determined. The first bifurcation point is determined from the plurality of determined bifurcation points based on their positional relationship and the like. Note that it is possible to manually set a reference point on a displayed image via an input device such as a mouse or pointer.

The point-of-interest determination unit 118 sets a plurality of points of interest on the lung field. A lung function index is obtained from the moving distances of points of interest from the reference point upon respiration. A plurality of points of interest are set on the image in the maximum inspiratory phase t1 and the image in the maximum expiratory phase t2. A plurality of points of interest are set on the wall contour of the lung, a node, and a tumor. Although it is possible to manually set these points of interest on a displayed image via an input device such as a mouse or pointer, it is preferable to automatically set such points. The point-of-interest determination unit 118 extracts a lung region from each of the image in the maximum inspiratory phase t1 and the image in the maximum expiratory phase t2 by threshold processing, e.g., region growing. A point of interest is set on the wall contour of the extracted lung region for each predetermined angle from a reference point.

Points of interest to be set are not limited to those on the wall contour of the lung region. Points of interest can be a lung node or tumor. As points of interest, any or all of a point on the wall contour of a lung region, a lung node, and a tumor can be used.

The vector processing unit 119 calculates the positions of points of interest relative to the reference point.

In this case, the vector processing unit 119 calculates vectors $V\rightarrow(t1, \theta1)$ to $V\rightarrow(t1, \theta N)$ of a plurality of (N) points of interest with reference to the reference point on the image in the maximum inspiratory phase t1. Likewise, the vector processing unit 119 calculates vectors $V\rightarrow(t2, \theta1)$ to $V\rightarrow(t2, \theta N)$ of a plurality of points of interest on the image in the maximum expiratory phase t2.

The vector processing unit 119 calculates the vector difference between corresponding points of interest on the image in the maximum inspiratory phase t1 and the image in the maximum expiratory phase t2. More specifically, the vector processing unit 119 calculates vector differences $|V\rightarrow(t1, \theta m)-V\rightarrow(t2, \theta m)|$ between a plurality of vectors of a plurality of points of interest on the image in the maximum inspiratory phase t1 and a plurality of vectors of a plurality of points of interest on the image in the maximum expiratory phase t2 which have the same angles. That is, the moving distance of each point of interest upon respiratory motion is quantitatively obtained with reference to a relatively fixed reference point.

Although vector difference processing is performed between the maximum inspiratory phase t1 and the maximum expiratory phase t2, it is possible to perform vector difference processing between corresponding respiratory phases in different respiratory periods.

The lung function index calculation unit 120 calculates lung function indexes such as the quantitative values of lung volumes in the phases t1 and t2, a rate of change in lung volume, and the quantitative values of the changing volumes from the moving distances of a plurality of calculated points of interest upon respiratory motion. The display processing unit 116 performs processing necessary to display the calculated lung function indexes as numerical values together with an image or in correspondence with hues or luminances corresponding to the index values at corresponding positions on an image.

FIG. 2 shows an operation procedure according to this embodiment. First of all, a lung field region is repeatedly scanned by dynamic scanning over at least one respiratory period along with the detection of a flow rate of respiration of an object by the respiratory sensor 107 (S1). Although the operation in this embodiment will be described as so-called four-dimensional scanning that repeats three-dimensional scanning at the same position using an X-ray cone beam, it is possible to repeat so-called two-dimensional scanning by using an X-ray fan beam. FIG. 3 exemplifies the flow rate (volume)/time curve detected by the respiratory sensor 107. The storage unit 112 stores the data of the flow rate/time curve detected by the respiratory sensor 107 in association with projection data by using a time code. Note that in the following processing, analysis can be performed by either simple scanning or scanning with a contrast medium. The specific phase determination unit 115 determines the maximum inspiratory phase t1 from the stored flow rate/time curve (S2).

Figure 4:
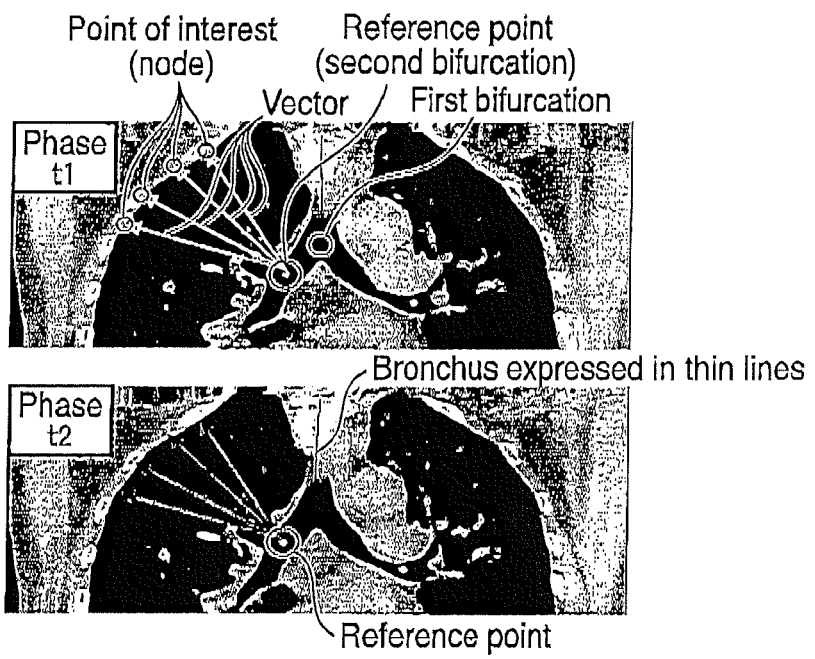
FIG. 4 is a view for supplementary explanation of steps S4, S5, and S6 in FIG. 2.
Figure 6:
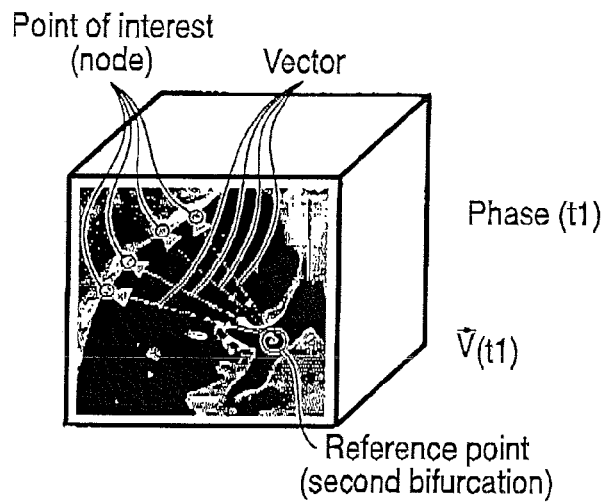
FIG. 6 is a view for supplementary explanation of steps S4, S5, and S6 in FIG. 2 for a three-dimensional image as a target.

The reference point determination unit 117 sets a reference point on the image in the maximum inspiratory phase t1 (S3). The reference point is typically the first bifurcation of the bronchus. As shown in FIGS. 4 and 6, the reference point determination unit 117 extracts a bronchus region from the image in the maximum inspiratory phase t1 by threshold processing (S3), and performs thinning processing for the extracted bronchus region. With this processing, the bronchus is expressed in lines. A plurality of bifurcation points on the bronchi expressed in lines are determined, and the first, bifurcation point is determined as a reference point from the plurality of determined bifurcation points for each of the left and right lungs (S4). Note that it is possible to manually set reference points on the displayed image (S3').

The point-of-interest determination unit 118 then automatically sets a plurality of points of interest on the lung field of the image in the maximum inspiratory phase t1 or the operator manually sets points of interest arbitrarily via an input device (S5). This automatic processing is performed by extracting a lung region by threshold processing, setting points of interest at predetermined angular intervals from a reference point on the wall contour of the extracted lung region, and also setting points of interest on a node portion and a tumor which are relatively easy to determine by threshold processing using another threshold.

The vector processing unit 119 calculates the vectors $V\rightarrow(t1, \theta1)$ to $V\rightarrow(t1, \theta N)$ of a plurality of (N) points of interest set on the image in the maximum inspiratory phase t1 (S6).

Figure 7:
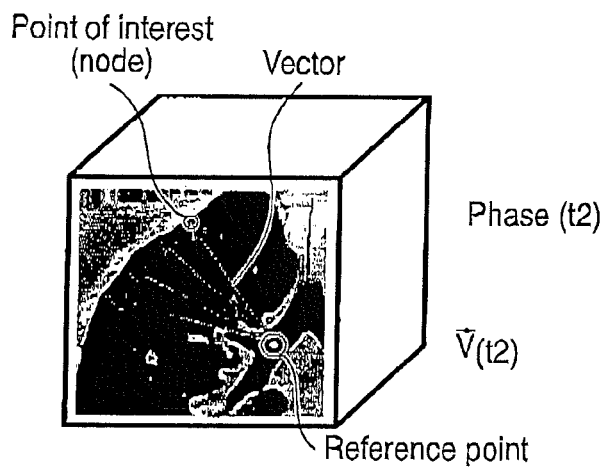
FIG. 7 is a view for supplementary explanation of steps S4, S5, and S6 in FIG. 2 for a three-dimensional image as a target.

The image in the maximum expiratory phase t2 is processed in a similar manner. The specific phase determination unit 115 determines the maximum expiratory phase t2 from the stored flow rate/time curve (S7). As shown in FIGS. 4 and 7, the reference point determination unit 117 extracts a bronchus region on the image in the maximum expiratory phase t2 (S8). The reference point determination unit 117 then performs thinning processing for the extracted bronchus region to determine a plurality of bifurcation points, and determines the first bifurcation point from the plurality of determined bifurcation points as a reference point for each of the left and right lungs (S9). It is possible to manually set reference points on the displayed image (S8'). The point-of-interest determination unit 118 then automatically/manually sets a plurality of points of interest on the lung field of the image in the maximum expiratory phase t2 (S10). The vector processing unit 119 calculates the vectors $V\rightarrow(t2, \theta1)$ to $V\rightarrow(t2, \theta N)$ of a plurality of (N) points of interest on the image in the maximum expiratory phase t2 (S11).

Figure 5:
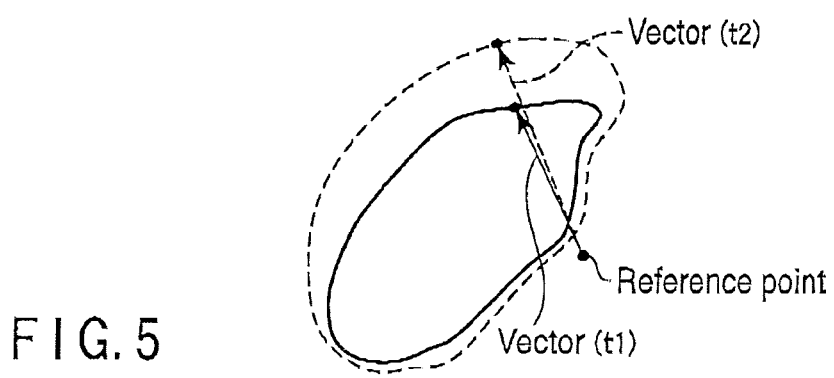
FIG. 5 is a view for supplementary explanation of step S12 in FIG. 2.
Figure 8:
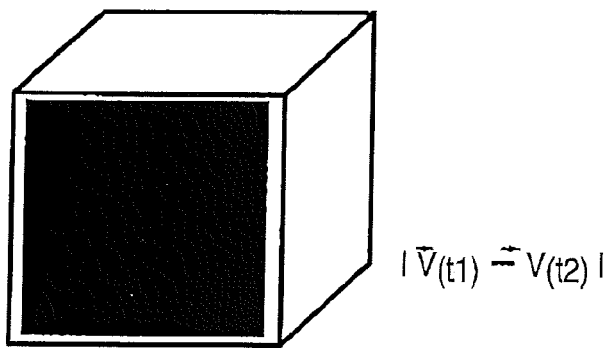
FIG. 8 is a view for supplementary explanation of step S13 in FIG. 2.

As shown in FIGS. 5 and 8, the vector processing unit 119 then calculates the vector differences $|V\rightarrow(t1, \theta m)-V\rightarrow(t2, \theta m)|$ between a plurality of vectors of a plurality of points of interest on the image in the maximum inspiratory phase t1 and a plurality of vectors of a plurality of points of interest on the image in the maximum expiratory phase t2 which have the same angles (S12). This makes it possible to quantitatively obtain the moving distance of each point of interest upon respiratory motion with reference to a relatively fixed reference point. Finally, the lung function index calculation unit 120 calculates lung function indexes such as the quantitative values of lung volumes in the phases t1 and t2, a rate of change in lung volume, and the quantitative values of the changing volumes from the moving distances of a plurality of calculated points of interest upon respiratory motion (S12). The display processing unit 116 displays the calculated lung function indexes as numerical values together with an image or in correspondence with hues or luminances corresponding to the index values at corresponding positions on an image (S13).

This embodiment can quantitatively perform lung function analysis using data in a plurality of phases. This operation is expected to allow easy visual check on these results on a displayed portion as well.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a storage unit which stores data of a plurality of images including an examination target organ of an object;
a reference point determining unit which determines, from each of the images, a reference point which is located in or near a region of the examination target organ and undergoes a relatively small displacement accompanying respiratory motion; and
a moving amount calculation unit which determines a position of each of a plurality of points of interest included in the region of the examination target organ relative to the reference point for each of the images, and calculates, directly based on the determined positions and the reference point, moving amounts for the corresponding points of interest between the images accompanying the respiratory motion.

2. The apparatus according to claim 1, wherein the reference point determining unit determines the reference point at a bifurcation point of a bronchus.

3. The apparatus according to claim 2, wherein the reference point determining unit extracts a region of the bronchus by threshold processing, obtains a bronchus axis line by thinning processing, and determines the bifurcation point from the bronchus axis line.

4. The apparatus according to claim 1, further comprising a point-of-interest determining unit which determines the point of interest at one of a lung contour, a lung node, and a tumor.

5. The apparatus according to claim 1, further comprising a designating operation unit with which an operator designates the point of interest on each of the images.

6. The apparatus according to claim 1, wherein the moving amount calculation unit calculates the moving amount as an absolute distance.

7. The apparatus according to claim 1, wherein the moving amount calculation unit calculates a plurality of vectors from the reference point to the plurality of points of interest on each of the images, and calculates the moving amount by subtracting vectors of corresponding points of interest between the images.

8. The apparatus according to claim 1, wherein the image is one of a two-dimensional image and a three-dimensional image including the examination target organ.

9. The apparatus according to claim 1, wherein the images differ in phase of the respiratory motion.

10. The apparatus according to claim 1, wherein the images are substantially equal in phase of the respiratory motion.

11. The apparatus according to claim 1, further comprising a display unit which superimposes and displays the moving amount on the image.

12. An X-ray computer tomography apparatus comprising:
an X-ray tube which generates X-rays;
an X-ray detector which generates projection data by detecting X-rays transmitted through an object;
a reconstruction processing unit which reconstructs a plurality of images based on the projection data; and
an image processing unit which processes the images, the image processing unit including
a storage unit which stores data of the plurality of images,
a reference point determining unit which determines, from each of the images, a reference point which is located in or near a region of the examination target organ and undergoes a relatively small displacement accompanying respiratory motion, and
a moving amount calculation unit which determines a position of each of a plurality of points of interest included in the region of the examination target organ relative to the reference point for each of the images, and calculates, directly based on the determined positions and the reference point, moving amounts for the corresponding points of interest between the images accompanying the respiratory motion.

13. The apparatus according to claim 12, wherein the reference point determining unit determines the reference point at a bifurcation point of a bronchus.

14. The apparatus according to claim 12, further comprising a point-of-interest determining unit which determines the point of interest at one of a lung contour, a lung node, and a tumor.

15. The apparatus according to claim 12, wherein the moving amount calculation unit calculates a plurality of vectors from the reference point to the plurality of points of interest on each of the images, and calculates the moving amount by subtracting vectors of corresponding points of interest between the images.

16. The apparatus according to claim 12, wherein the images differ in phase of the respiratory motion.

17. The apparatus according to claim 12, wherein the images are substantially equal in phase of the respiratory motion.

18. The apparatus according to claim 12, further comprising a display unit which superimposes and displays the moving amount on the image.

19. An image processing apparatus comprising:
a storage unit configured to store data of at least 3-dimensional X-ray CT images which include an examination target organ of an object and which are taken in different phases of respiration;
a reference point determining unit configured to determine a reference point located in or near the examination target organ, from the 3-dimensional X-ray CT images; and
a moving amount calculation unit configured to determine a plurality of points of interest on the 3-dimensional X-ray CT images of the examination target organ, and to calculate a moving amount by which each of the points of interest moves as a result of a phase change of respiration, relative to the reference point.

* * * * *